US012236792B2

(12) United States Patent
Hiolle et al.

(10) Patent No.: US 12,236,792 B2
(45) Date of Patent: Feb. 25, 2025

(54) ELECTRONIC AIRCRAFT NAVIGATION ASSISTANCE SYSTEM, ASSOCIATED METHOD AND COMPUTER PROGRAM

(71) Applicant: THALES, Courbevoie (FR)

(72) Inventors: Jean-Etienne Hiolle, Toulouse (FR); Eric Laurent, Toulouse (FR); Laurent Laforge, Toulouse (FR); David Barbey, Toulouse (FR); Erick Rakotoarisoa, Toulouse (FR)

(73) Assignee: THALES, Courbevoie (FR)

( * ) Notice: Subject to any disclaimer, the term of this patent is extended or adjusted under 35 U.S.C. 154(b) by 248 days.

(21) Appl. No.: 18/164,810

(22) Filed: Feb. 6, 2023

(65) Prior Publication Data

US 2023/0260409 A1 Aug. 17, 2023

(30) Foreign Application Priority Data

Feb. 11, 2022 (FR) ...................................... 2201228

(51) Int. Cl.
*G08G 5/00* (2006.01)

(52) U.S. Cl.
CPC .......... *G08G 5/006* (2013.01); *G08G 5/0021* (2013.01); *G08G 5/0086* (2013.01)

(58) Field of Classification Search
CPC .... G08G 5/006; G08G 5/0021; G08G 5/0086; G06F 16/29; G01C 21/005; G01C 21/3881; G01C 21/20

(Continued)

(56) References Cited

U.S. PATENT DOCUMENTS 5,381,338 A * 1/1995 Wysocki ............. G09B 29/007
                                                    348/116
6,456,938 B1 * 9/2002 Barnard .................. G01S 19/19
                                                    701/487

(Continued)

FOREIGN PATENT DOCUMENTS

WO   2008018906 A2   2/2008
WO   2008018906 A3   2/2008

OTHER PUBLICATIONS

INPI Preliminary Search Report for French Patent Application 22 01228, Sep. 30, 2022, 2 pages.

(Continued)

*Primary Examiner* — Jaime Figueroa
(74) *Attorney, Agent, or Firm* — Soquel Group LLC

(57) ABSTRACT

A system including a module for acquiring source bases of terrain data corresponding to an area of a terrain, divided into a plurality of cells; each source base containing, for each cell, an elevation, a module for transposing each source base into a respective transposed base of terrain data corresponding to the area of terrain, divided according to a reference mesh into a plurality of transposed cells, each transposed base including, for each transposed cell, a transposed elevation, a module for evaluating a local consistency level, based on the comparison of the transposed elevation of the cell with the transposed elevation of the corresponding transposed cell of at least one other transposed base, and an assistance module configured to determine a navigation assistance datum for the aircraft, depending on the assessed local consistency level.

11 Claims, 6 Drawing Sheets

(58) Field of Classification Search
USPC .......................................................... 701/1, 3
See application file for complete search history.

(56) References Cited

U.S. PATENT DOCUMENTS

| | | | | |
|---|---|---|---|---|
| 6,469,664 | B1* | 10/2002 | Michaelson | G01C 21/22 367/909 |
| 6,750,815 | B2* | 6/2004 | Michaelson | G01C 21/22 367/909 |
| 6,757,445 | B1* | 6/2004 | Knopp | G01C 11/06 382/296 |
| 7,061,510 | B2* | 6/2006 | Rhoads | G06F 16/29 348/231.1 |
| 7,352,292 | B2* | 4/2008 | Alter | G06T 17/05 340/945 |
| 8,744,760 | B1* | 6/2014 | Mishmash | G01C 23/005 701/454 |
| 9,076,045 | B2* | 7/2015 | Atsmon | B60W 40/09 |
| 9,080,872 | B2* | 7/2015 | Tarnok | G06F 9/451 |
| 9,441,985 | B2* | 9/2016 | Riley | G05D 1/0038 |
| 9,443,152 | B2* | 9/2016 | Atsmon | G01C 21/362 |
| 9,970,774 | B2* | 5/2018 | Atsmon | G08G 1/168 |
| 10,147,004 | B2* | 12/2018 | Atsmon | G08G 1/09626 |
| 11,551,560 | B2* | 1/2023 | Piradi | G08G 5/0086 |
| 11,579,611 | B1* | 2/2023 | Lopez | G05D 1/0094 |
| 11,640,764 | B1* | 5/2023 | Alonso Lopez | G08G 5/006 701/7 |
| 2002/0060784 | A1* | 5/2002 | Pack | G01S 17/89 356/6 |
| 2002/0122564 | A1* | 9/2002 | Rhoads | G06F 16/29 382/100 |
| 2002/0124171 | A1* | 9/2002 | Rhoads | G06T 1/0021 713/176 |
| 2003/0112171 | A1* | 6/2003 | Michaelson | G08G 3/02 340/984 |
| 2003/0210181 | A1* | 11/2003 | Hager | G01S 13/86 342/174 |
| 2003/0215110 | A1* | 11/2003 | Rhoads | G06F 16/58 382/100 |
| 2004/0141170 | A1* | 7/2004 | Jamieson | G01S 17/89 356/612 |
| 2004/0160341 | A1* | 8/2004 | Feyereisen | G08G 5/0086 340/970 |
| 2004/0161131 | A1* | 8/2004 | Rhoads | G06F 16/7854 382/100 |
| 2005/0031197 | A1* | 2/2005 | Knopp | G01C 11/06 382/154 |
| 2007/0002040 | A1* | 1/2007 | Oldroyd | G01C 11/00 345/419 |
| 2007/0171094 | A1* | 7/2007 | Alter | G01C 23/00 340/970 |
| 2009/0040070 | A1* | 2/2009 | Alter | G06T 17/05 340/945 |
| 2010/0020066 | A1* | 1/2010 | Dammann | G06T 19/00 345/419 |
| 2011/0224840 | A1* | 9/2011 | Vanek | G01S 17/89 701/1 |
| 2012/0194681 | A1* | 8/2012 | Atsmon | B60W 40/09 348/149 |
| 2013/0096819 | A1* | 4/2013 | Tarnok | G01C 21/3844 701/538 |
| 2014/0032013 | A1* | 1/2014 | Riley | G05D 1/0038 701/2 |
| 2014/0111647 | A1* | 4/2014 | Atsmon | G08G 1/14 348/148 |
| 2015/0377634 | A1* | 12/2015 | Atsmon | G01C 21/3602 701/462 |
| 2016/0371551 | A1* | 12/2016 | Atsmon | G06Q 30/0261 |
| 2021/0097869 | A1* | 4/2021 | Piradi | G01C 21/20 |

OTHER PUBLICATIONS

Grohmann, Carlos H., "Evaluation of TanDEM-X DEMs on selected Brazilian sites: comparison with SRTM, ASTER GDEM and ALOS AW3D30", arxiv.org Cornell University Library, Ithica, NY 14853, Sep. 15, 2017, pp. 1-20.

Vadlamani, A., et al., "A 3D spatial integrity monitor for terrain databases", Digital Avionics Systems Conference, 2004 DASC 04. The 23rd Salt Lake City, UT, USA Oct. 24-28, 2004, Piscataway, NJ, USA, IEEE, US, vol. 1. pp. 1-13.

* cited by examiner

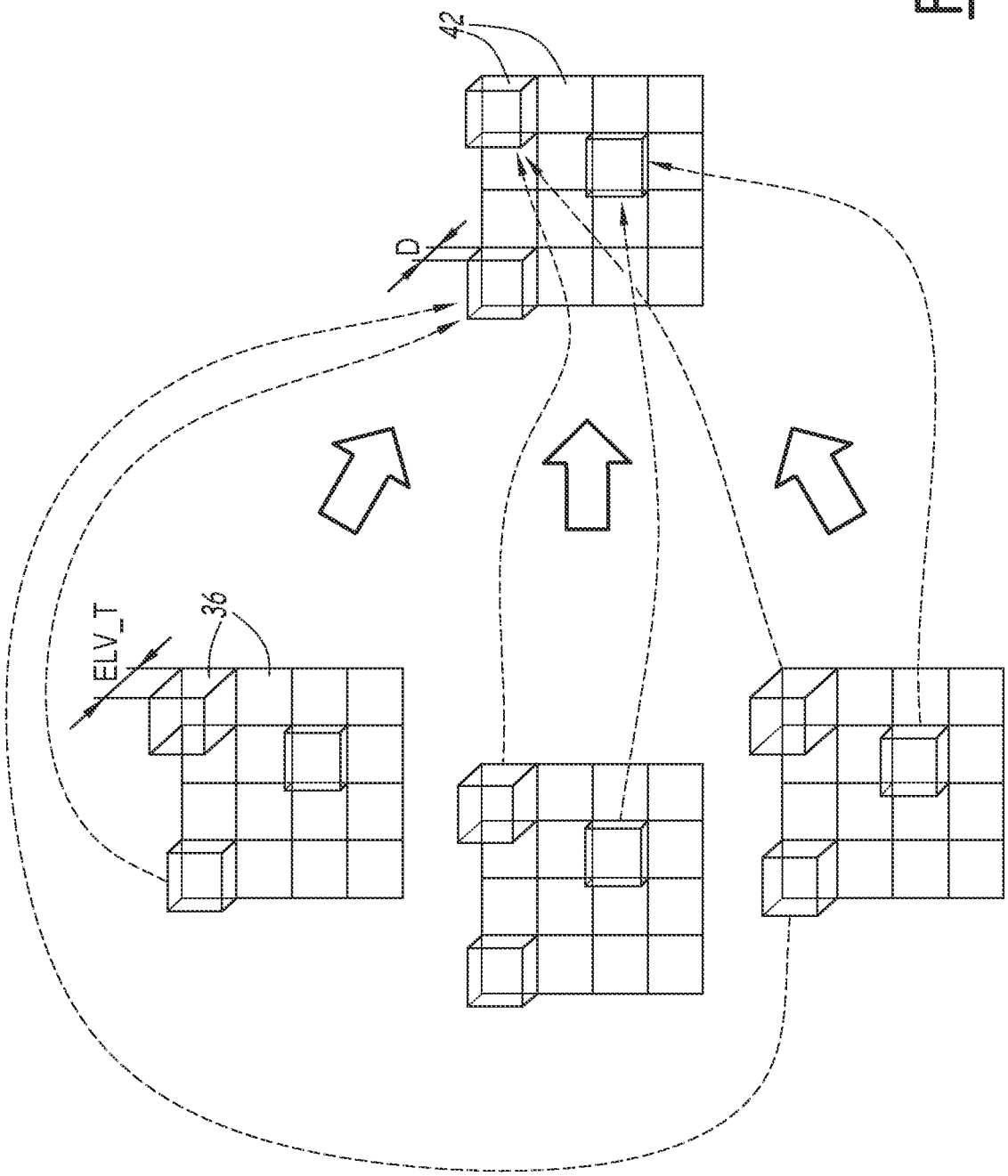

ELECTRONIC AIRCRAFT NAVIGATION ASSISTANCE SYSTEM, ASSOCIATED METHOD AND COMPUTER PROGRAM

REFERENCE TO RELATED APPLICATION

This application is a U.S. non-provisional application claiming the benefit of French Application No. 22 01228, filed on Feb. 11, 2022, which is incorporated herein by reference in its entirety.

TECHNICAL FIELD OF THE INVENTION

This invention relates to an electronic system for assisting the navigation of an aircraft.

The invention also relates to a method of assisting the navigation of an aircraft, implemented by such an electronic assistance system.

This invention further relates to a computer program comprising software instructions which, when executed by a computer, implement such a method.

BACKGROUND OF THE INVENTION

The invention relates to the field of terrain databases and aircraft navigation assistance systems. A terrain database is defined here as a collection of data representative of the physical characteristics of a terrain, prior to their compilation into a data set readable by a computer processor. Aircraft navigation assistance systems are, for example, carried on board an aircraft and provide navigation assistance information to a user of the aircraft or to a command system of the aircraft. Navigation assistance systems are also used outside an aircraft. The navigation assistance systems then generate, for example, information to be loaded or transmitted to an aircraft, in order to assist a user, or an on-board computer, to navigate the aircraft.

Terrain databases generally correspond to an area of terrain that is likely to be overflown by the aircraft. Such databases include terrain elevation data that is used in aircraft navigation assistance. Knowledge of terrain elevation is essential for aircraft navigation, particularly when the aircraft is being flown autonomously.

In order to better know the degree of confidence that one can have in the elevations of a field database, it is known to characterize the field databases by a confidence index in a level of coherence. The level of consistency corresponds, for example, to a difference between the elevation at a point or position in one database and the elevation at the same point or position in another database. The level of coherence thus translates into vertical accuracy by comparing the elevations of two terrain databases for the same position. The confidence index then characterizes, for example, the probability that the elevation difference between the databases used to assess consistency is below a given consistency level, i.e., a given elevation difference.

A terrain database based on the SRTM (Shuttle Radar Topography Mission) model, developed in the late 1990s, is known. More recent models are also known, such as the NASA Digital Elevation Model (NASADEM), the Advanced Spaceborne Thermal Emission and Reflection Radiometer Global Digital Elevation Model (ASTER GDEM), the Advanced Land Observing Satellite (ALOS) or the Arctic Digital Elevation Model (ArcticDEM). The value of the consistency level is generally lower for a given confidence index in recent models than in older models.

It is also known to use the confidence index and consistency level values of terrain databases for aircraft navigation assistance. The RTCA DO-276 rev C and EUROCAE ED-98 rev C standards define, for example, confidence indices for a level of consistency to be respected.

For example, it may be required that a 95% confidence level in a 30 m consistency level be verified before elevation data from a terrain database can be used for navigation in an airport area.

Similarly, it may be required that an 80% confidence level in an 80 m consistency level be verified before elevation data from a terrain database can be used for navigation outside airport areas.

However, current electronic aircraft navigation systems, where navigation is based on a confidence level of consistency across a database, are not fully satisfactory.

Indeed, even if such systems assist navigation via values characterizing a database as a whole, these systems do not allow for possible local errors in the model. The data passing through such systems cannot then, for example, be used to assist in the elaboration of a trajectory actively by generating navigation assistance data for an aircraft and can generally only be used to verify such a trajectory already elaborated.

SUMMARY OF THE INVENTION

One of the aims of the invention is then to propose a system allowing to generate a navigation assistance data for the aircraft taking into account possible local elevation errors of a terrain database.

To this end, the subject of the invention is an electronic system for assisting the navigation of an aircraft, including:
  an acquisition module configured to acquire a plurality of terrain data source bases, each source base corresponding to an area of terrain likely to be overflown by the aircraft, divided into a mesh of a plurality of cells, each corresponding to a sector of the terrain area; each source base containing, for each cell, an elevation,
  a transposition module configured to transpose each source base into a respective transposed base of terrain data, each transposed base corresponding to the area of terrain, divided according to a reference mesh into a plurality of transposed cells, the reference mesh being common to all the transposed bases, each transposed base including, for each transposed cell, a transposed elevation,
  an evaluation module configured to evaluate a local consistency level for at least one transposed cell of a respective transposed base, based on the comparison of the transposed elevation of the cell with the transposed elevation of the corresponding transposed cell of at least one other transposed base, and
  an assistance module configured to determine a navigation assistance data for the aircraft, according to the local coherence level evaluated for the at least one transposed cell.

Such an electronic system in which the navigation assistance data is calculated according to the local coherence level evaluated for at least one transposed cell makes it possible to obtain navigation data taking into account possible local errors in the source bases used to generate the assistance data.

Such an electronic system may then better meet the requirements of the field databases used in the aeronautical field and in particular the requirements of the DPAL 1 (*Data Process Assurance Level* 1) defined in the RTCA DO-200B/ EUROCAE ED-76A standard (*Standards for Processing*

*Aeronautical Data*) as well as the requirements of the FAA AC20-153 standard (*Acceptance of Aeronautical Data Processes and Associated Databases*).

In other beneficial aspects of the invention, the electronic system for electrical energy conversion includes one or more of the following features, taken in isolation or in any technically possible combination:

the evaluation module is configured to evaluate the local coherence level according to the smallest deviation in elevation between the transposed elevation of the cell and the transposed elevation of the corresponding transposed cell of each other transposed base;

the local coherence level is chosen from a high coherence level, a medium coherence level and a low coherence level the local coherence level assessed being:
 a high level of consistency if the smallest elevation difference is less than or equal to 15 m;
 a medium level of consistency if the smallest elevation difference is greater than 15 m and less than or equal to 30 m;
 a low level of consistency if the smallest elevation difference is greater than 30 m and less than or equal to 100 m;

each source base further contains, for each cell, a metadata associated with the elevation, each transposed base including, for each transposed cell, a transposed metadata, the evaluation module then being configured to evaluate the level of local coherence for each transposed cell of a respective transposed base, as a function of the transposed metadata of the cell and the transposed metadata of the corresponding cell of each other transposed base;

the metadata is indicative of a measured elevation or a predefined elevation, the evaluation module then being configured to evaluate the level of local consistency based solely on the comparison of elevations of transposed cells whose metadata is indicative of a measured elevation;

the system includes:
 a segmentation module configured to segment the area of terrain corresponding to at least one of the transposed bases into a plurality of areas of interest, each area of interest including a plurality of adjacent transposed cells; the assistance module being configured to determine, for the area of interest, a confidence index at a given consistency level, the confidence index forming the assistance data and being determined as a function of the local consistency level of each transposed cell of the area of interest;

the confidence index for a given coherence level is determined by the proportion of transposed cells in the area of interest whose local coherence level is greater than or equal to the given coherence level;

the system includes:
 a user interface configured to receive, from a user, a target consistency level and a boundary confidence in the target consistency level; and
 a validation module configured to:
  validate an area of interest if the confidence index determined in the target consistency level is greater than or equal to the confidence index limit;
  reject an area of interest if the confidence index determined in the target consistency level is lower than the limiting confidence index; and
 a command module, configured to:
  command a display of a validated state if the area of interest is validated by the validation module, or a rejected state if the area of interest is rejected by the validation module; and/or
  command the generation of an aircraft trajectory outside the rejected area(s) of interest; and the assistance module is configured to determine a target base of terrain data, corresponding to the area of the terrain, divided according to the reference mesh into a plurality of target cells; the target base including, for each target cell, a target elevation forming the assistance data, the assistance module then being configured to determine the target elevation of the target cell as a function of the transposed elevation of at least two corresponding transposed cells, the local coherence level of which is greater than the local coherence level of the other corresponding transposed cells.

The invention further relates to a method of assisting the navigation of an aircraft, implemented by an electronic aircraft navigation assistance system, the method including the following operations:

acquisition of a plurality of terrain data source bases, each source base corresponding to an area of terrain likely to be overflown by the aircraft, divided into a mesh of a plurality of cells, each corresponding to a sector of the area of terrain; each source base containing, for each cell, an elevation transposition of each source base into a respective transposed base of terrain data, each transposed base corresponding to the zone of the terrain, divided according to a reference grid into a plurality of transposed cells, the reference grid being common to all the transposed bases, each transposed base including, for each transposed cell, a transposed elevation, evaluating a local consistency level for at least one transposed cell of a respective transposed base, based on the comparison of the transposed elevation of the cell with the transposed elevation of the corresponding transposed cell of at least one other transposed base, and determination of an aircraft navigation assistance datum, based on the evaluated local consistency level of at least one transposed cell of one of the transposed bases.

The purpose of the invention is also a computer program including software instructions which, when executed by a computer, implement a method for assisting the navigation of an aircraft, as defined above.

BRIEF DESCRIPTION OF THE DRAWINGS

These features and advantages of the invention will appear more clearly upon reading the following description, given solely as a non-limiting example, and made in reference to the attached drawings, in which:

FIG. 6 is a schematic representation of the reference mesh cutting out a corresponding area of a terrain, for a plurality of source bases, and a representation of the reference mesh cutting out the corresponding area of the terrain for a target base determined by the system of FIG. 2.

DETAILED DESCRIPTION

In the remainder of the description, the expression "substantially equal to" defines an equality relationship at +/−10%, preferably at +/−5%.

Figure 1:
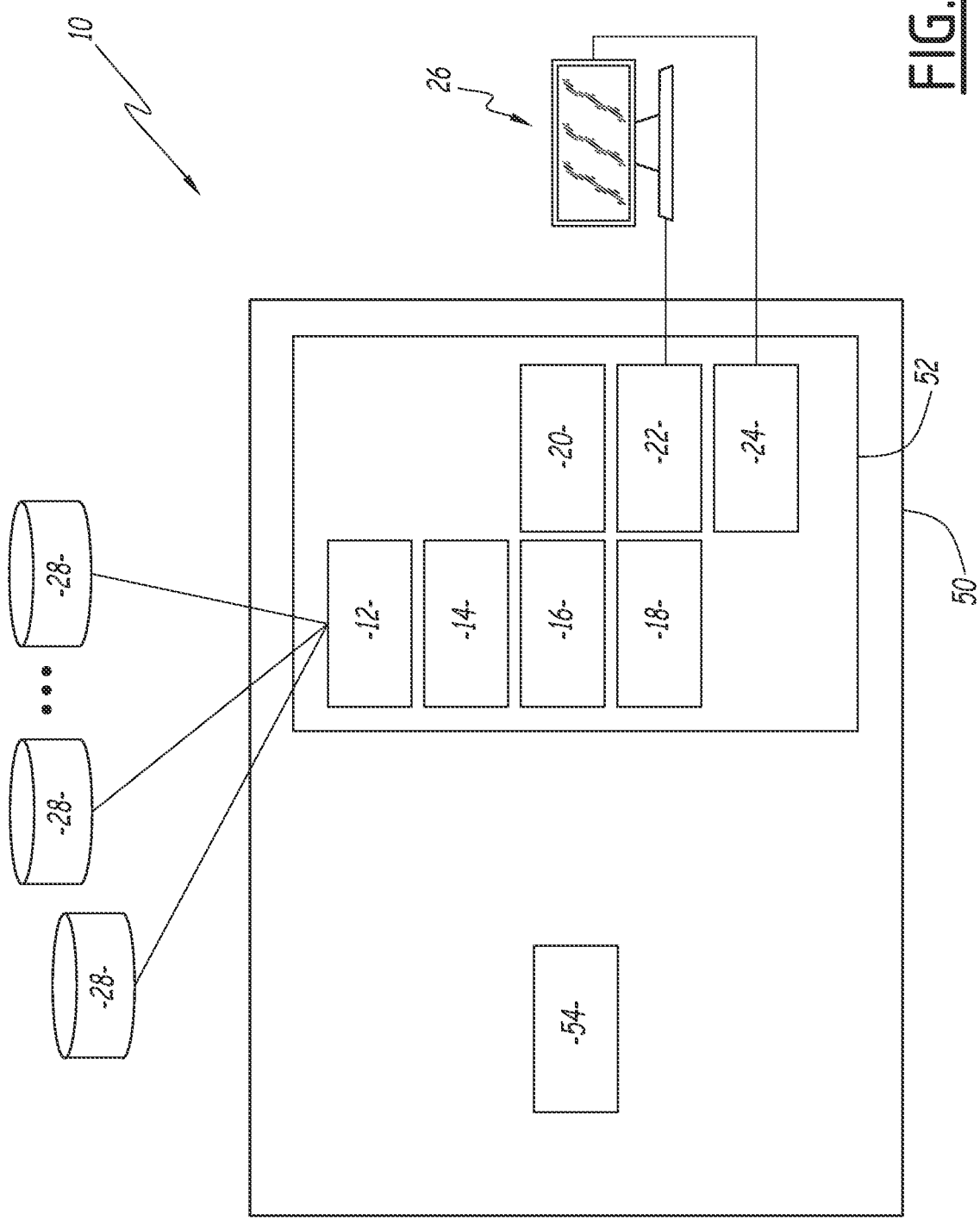
FIG. 1 is a schematic representation of an electronic navigation assistance system of an aircraft according to a first embodiment of the invention.
Figure 2:
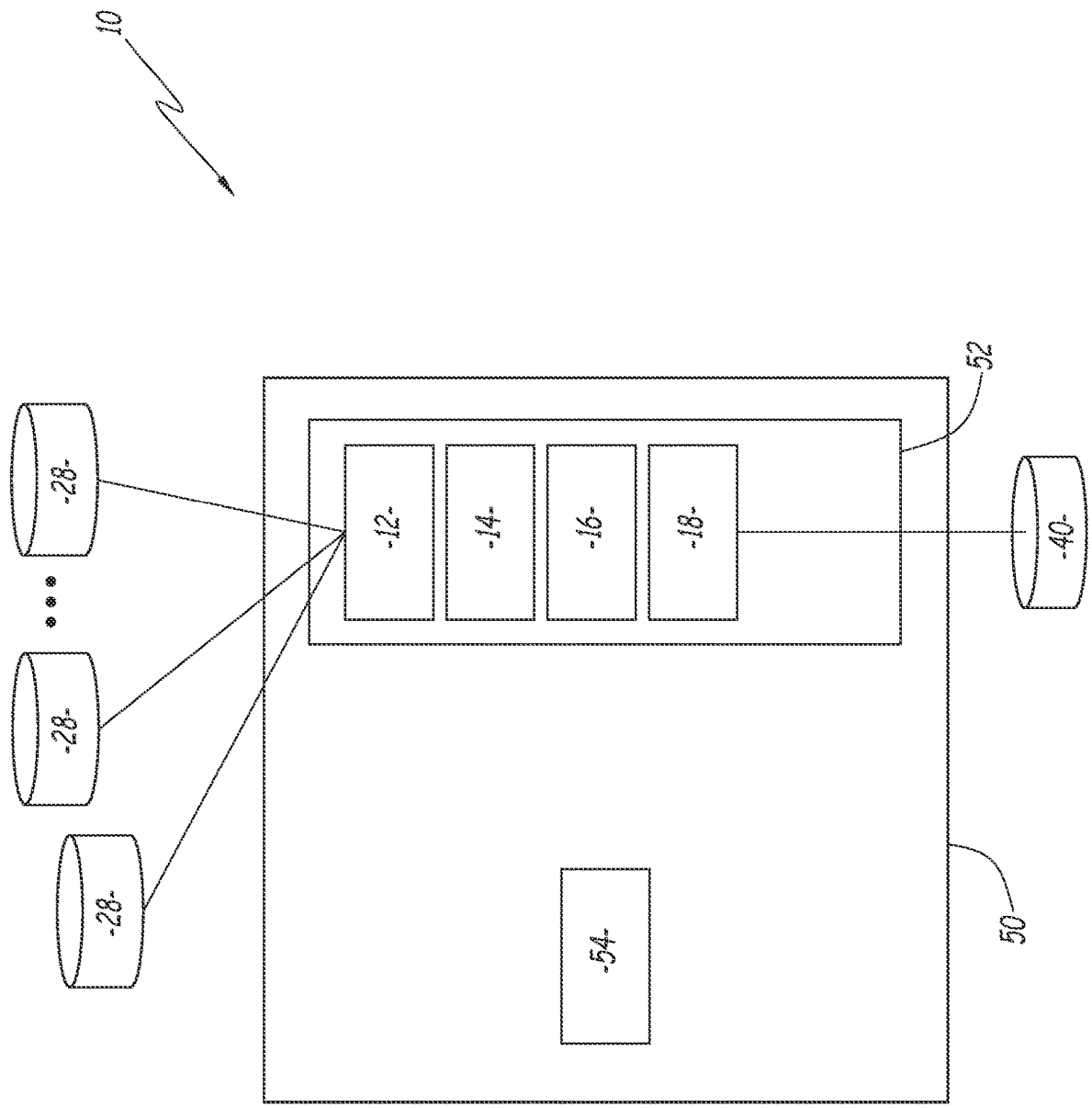
FIG. 2 is a view similar to that of FIG. 1 according to a second embodiment of the invention.

In FIGS. 1 and 2, an aircraft navigation assistance system 10 includes an acquisition module 12, a transposition module 14, an evaluation module 16, and an assistance module 18.

In the embodiment shown in FIG. 1, assistance system 10 further includes a segmentation module 20, a validation module 22, a command module 24, and a user interface 26.

Assistance system 10 is, for example, on board the aircraft whose navigation the system 10 assists. Alternatively, assistance system 10 is installed outside the aircraft whose navigation the system 10 assists. Alternatively, and as will be discussed later, part of system 10, for example user interface 26, validation module 22 and command module 24, is carried on board the aircraft, with the remainder of system 10 being installed outside the aircraft.

The aircraft is, for example, an airplane. Alternatively, the aircraft is a helicopter, or a drone that can be flown remotely by a pilot or an autonomous drone.

Acquisition module 12 is configured to acquire a plurality of source bases 28 of field data, hereafter referred to as source bases 28. Acquisition module 12 is in other words configured to acquire data contained in source bases 28.

Figure 4:
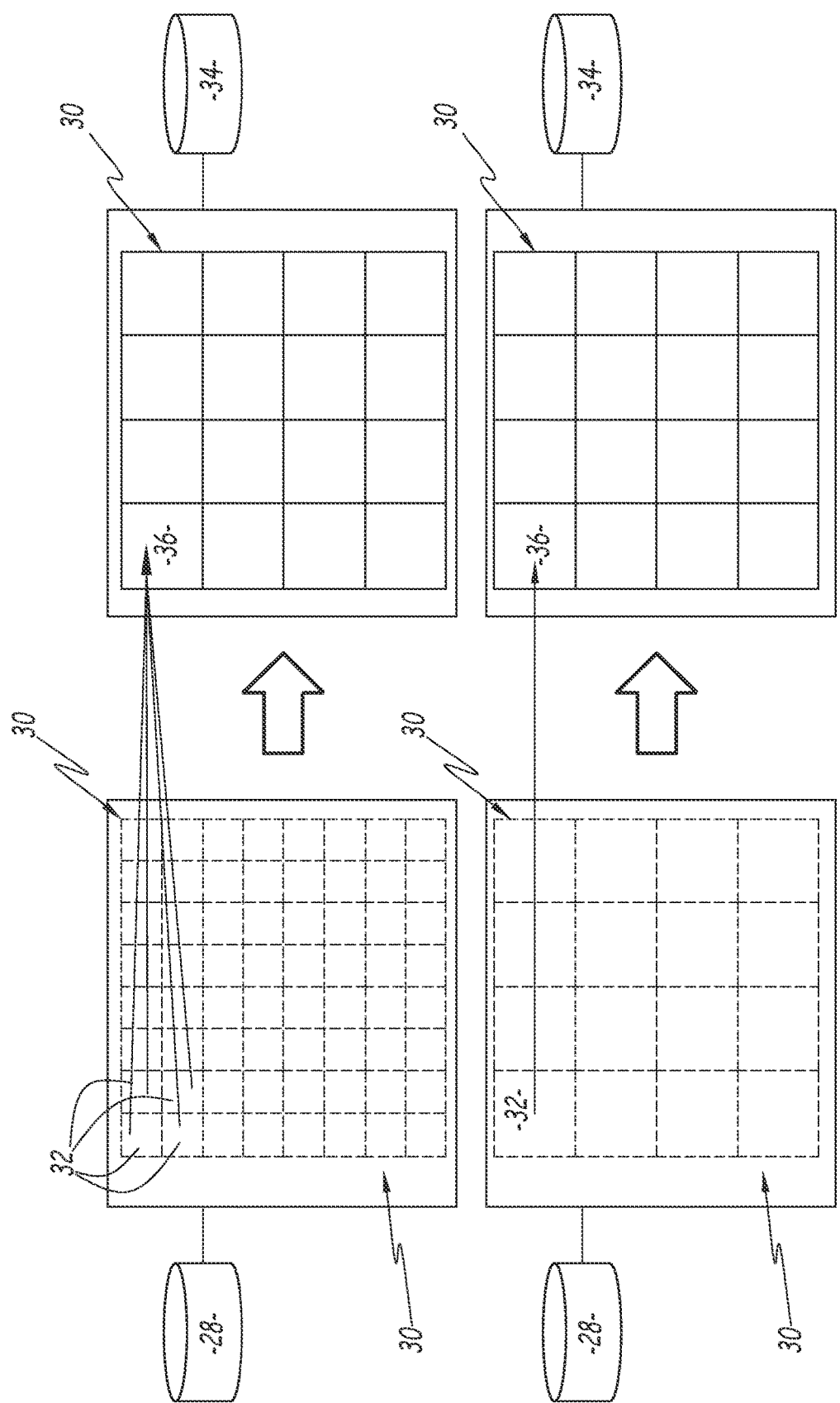
FIG. 4 is a schematic representation of two meshes cutting out a corresponding area of land, before and after a transposition implemented by one of the systems of FIGS. 1 and 2.

As may be seen in FIG. 4, each source base 28 corresponds to an area 30 of a terrain likely to be overflown by the aircraft, divided in a mesh into a plurality of cells 32, each corresponding to a sector of area 30 of the terrain.

Cells 32 are, for example, square. A resolution of each database corresponds, for example, to the length of one side of a cell. The resolution is, for example, between 90 m and 15 m.

Each source database 28 is, for example, a terrain database of the same area 30 of the terrain, source databases 28 being distinct from each other but corresponding to the same area 30 of the terrain. For example, a first source base is a NASADEM base, a second source base is an ASTER GDEM base and a third source base is an ALOS base.

The resolution of each of the first, second and third bases is, for example, substantially equal to 30 m if area 30 of the terrain is located at the equator.

For an ALOS-type source base, the terrain is cut according to a grid such that an area 30 of terrain extending over the earth's surface over a region of 1° longitude by 1° latitude is cut into 3,600 cells by 3,600 cells.

For a source base 28 of the ASTER GDEM type, the terrain is cut according to a mesh such that an area 30 of terrain extending over the earth's surface over a region of 1° longitude by 1° latitude is cut into 3,601 cells by 3,601 cells.

For a source base 28 of the NASADEM type, the terrain is cut according to a mesh such that an area 30 of terrain extending on the earth's surface over a region of 1° longitude by 1° latitude is cut into 3,601 cells by 3,601 cells.

Each source base 28 contains, for each cell 32, an ELV elevation. Each source database 28 preferably further includes, for each cell 32, a metadata MD associated with ELV elevation.

ELV elevation for a cell 32 corresponds to a height of the ground within the cell 32. ELV elevation corresponds, for example, to a reference value of a terrain height in relation to a reference altitude, typically Mean Sea Level (MSL). Each source base therefore includes, for example, one ELV elevation per cell 32.

MD metadata corresponding to ELV elevation reflects an origin of ELV elevation in source database 28. MD metadata is in particular indicative of a measured elevation or a predefined elevation.

An MD metadata indicative of a measured elevation is a metadata associated with an ELV elevation that has been measured during the development of source database 28. In other words, an MD metadata indicative of a measured elevation indicates that the ELV elevation to which the MD metadata corresponds is an elevation that may be described as "authentic" for source base 28, and that ELV elevation is derived from source base 28's own measurements. Thus, for a given source base 28, an MD metadata indicative of a measured elevation indicates that the ELV elevation to which the MD metadata corresponds is an elevation independent of the elevation of other source bases 28, i.e., such an elevation does not originate from another source base 28. MD metadata thus characterizes, when it is indicative of a measured elevation, a local independence of source base 28 from other source bases 28.

In contrast, MD metadata indicative of a predefined elevation is metadata associated with an ELV elevation that has not been measured during the development of source database 28. In other words, an MD metadata indicative of a predefined elevation indicates that the ELV elevation to which the MD metadata corresponds is an ELV elevation that may be qualified as "not authentic" for source base 28, as this ELV elevation comes from measurements that are not specific to source base 28. Thus, for a given source base 28, an MD metadata indicative of a predefined elevation indicates that the ELV elevation to which the MD metadata corresponds is an elevation dependent elevation of another source base 28, i.e., that such an elevation is from another source base 28. MD metadata thus characterizes, when indicative of a predefined elevation, a local dependency of source database 28 on other source databases 28.

A metadata MD indicative of a predefined elevation is, for example, associated with an ELV elevation measured during the construction of a source base 28 which is not source base 28 containing the ELV elevation. The presence of such an elevation in a source database, and thus of metadata indicative of a predefined elevation, is typically due to a problem with the ELV elevation measurement for cell 32 when source database 28 was compiled (e.g., due to inappropriate meteorology for the measurement), with the ELV elevation being replaced by a predefined elevation from another source database 28.

Transposition module 14 is configured to transpose each source base 28 into a transposed base 34, as schematically illustrated in FIG. 4.

Each transposed base 34 corresponds to area 30 of the terrain, divided according to a reference grid into a plurality of transposed cells 36.

As illustrated in FIG. 4, the reference mesh is common to all transposed bases 34. Thus, two source bases 28 corresponding to an area cut according to a different mesh correspond, once transposed into two transposed bases 34, to the same area cut according to the reference mesh which is common to these transposed bases 34.

The reference mesh is for example chosen so that it corresponds to the least fine mesh according to which the terrain is cut, for the plurality of source bases 28. In other words, in this example, the transposed cells 36 cutting the terrain for each transposed base 34 have the size of the largest cells among the cells cutting the terrain for each source base 28.

In one particular example, an area 30 of land extending across the earth's surface over a region of 1° longitude by 1° latitude is partitioned into 1,200 transposed cells by 1,200 transposed cells, according to the reference grid. Each transposed cell is then, for example, roughly in the form of a square with a side length corresponding to a resolution of 3 arc seconds. The value of the resolution in arc second(s) defines the dimension corresponding to one side of a smallest representative element, the smallest representative element here being the transposed cell.

In the example where a first source base is of the NASA-DEM type, a second source base is of the ASTER GDEM type, and a third source base is of the ALOS type, transposition module 14 transposes the first source base into a first transposed source base, the second source base into a second transposed source base and the third source base into a third transposed source base, respectively, the first, second and third transposed source bases cutting out area 30 of the terrain according to the reference grid.

Each transposed base 34 includes, for each transposed cell 36, a transposed elevation ELV_T. Each transposed base 34 preferably further includes, for each transposed cell 36, a transposed metadata MD_T associated with transposed elevation ELV_T.

Transposition module 14 is thus configured to determine transposed elevation ELV_T, and if applicable, transposed metadata MD_T, for a transposed base 34, from at least one elevation ELV and at least one metadata MD, of the source base 28 being transposed.

For example, transposition module 14 is configured to determine transposed elevation ELV_T of each transposed cell 36 from elevation ELV of a corresponding cell 32 of the transposed source base 28. Corresponding cell 32 is, for example, cell 32 of the source database covering the most common area of the terrain with transposed cell 36 of zone 30 of the terrain.

In a particular embodiment, transposition module 14 is configured to determine transposed elevation ELV_T from elevations ELV of a corresponding plurality of cells 32 of the source base 28 being transposed. Transposed elevation ELV_T of transposed cell 36 is, for example, the weighted average of elevations ELV of cells 32 corresponding to transposed cell 36 of transposed source base 28. For example, the average is weighted for each ELV elevation by the ratio of the area of corresponding terrain 30 of transposed cell 36 covered by cell 32, divided by the area of terrain 30 covered by transposed cell 36.

For example, transposition module 14 is configured to determine transposed metadata MD_T of each transposed cell 36 from metadata of a corresponding cell 32 of transposed source database 28. Corresponding cell 32 is, for example, cell 32 of source database 28 covering the most common area of the terrain with transposed cell 36 of terrain area 30.

Alternatively, transposition module 14 is configured to determine a transposed metadata MD_T indicative of a predefined elevation if metadata of a corresponding one of or cell 32 of transposed source base 28 is indicative of a predefined elevation.

Evaluation module 16 is configured to evaluate a local consistency level NCL for at least one transposed cell 36 of a transposed base 34. Evaluation module 16 is configured to evaluate local consistency level NCL based on a comparison of transposed elevation ELV_T of one of transposed cells 36 of one of transposed bases 34 with transposed elevation ELV_T of the corresponding transposed cell 36 of at least one other of transposed bases 34. In other words, evaluation module 16 is configured to evaluate local coherence level NCL for a transposed cell 36 based on elevation difference between the transposed cell 36 and one or more corresponding transposed cells 36 of other transposed bases 34.

In a preferred embodiment, evaluation module 16 is configured to evaluate local coherence level NCL of a transposed cell 36 based on the smallest elevation difference between transposed elevation ELV_T of the transposed cell 36 and transposed elevation ELV_T of the corresponding transposed cell 36 of each other transposed base 34.

In addition, and preferably, evaluation module 16 is, for example, configured to evaluate local consistency level NCL for each transposed cell 36 of a respective transposed base 34, based on transposed metadata MD_T of the transposed cell 36 and transposed metadata MD_T of the corresponding transposed cell 36 of each other transposed base 34. In other words, and since a transposed metadata MD_T is indicative of the dependence or independence of a transposed elevation ELV_T of a given transposed base 34 on transposed elevations of other transposed bases 34, evaluation module 16 evaluates local consistency level NCL for each transposed cell 36 based on dependence or independence of transposed elevation ELV_T of the transposed cell 36 and the corresponding transposed cell 36 of each other transposed base 34.

In particular, and according to this embodiment, evaluation module 16 is configured to evaluate local coherence level NCL based only on ELV_T elevations of transposed cells 36 whose MD_T metadata is indicative of a measured elevation, and in particular on the comparison of such ELV_T elevations. In other words, for a given transpose base 34, evaluation module 16 is configured to evaluate local coherence level NCL for a transpose cell 36 based only on ELV_T elevations of corresponding transpose cells 36 of other transpose bases 34 independent of ELV_T elevation of the transpose cell 36 of the given transpose base 34.

Evaluation module 16 is then configured to evaluate local consistency level NCL of a transposed cell 36 based on the smallest elevation difference between transposed elevation ELV_T of the transposed cell 36 and transposed elevation ELV_T of the corresponding transposed cell 36 of each other transposed base 34, transposed metadata MD_T associated with each of the compared transposed elevations ELV_T being indicative of a measured elevation.

In the example where a first source base is of the NASA-DEM type, a second source base is of the ASTER GDEM type, and a third source base is of the ALOS type, and following transposition of these bases local coherence level NCL for a transposed cell 36 of one of these bases is determined as a function of at least one elevation difference between transposed elevation ELV_T of the transposed cell 36 and transposed elevation ELV_T of the transposed cell 36 of one of the other transposed bases 34.

In particular, and in the preferred embodiment, transposed elevation ELV_T of the transposed cell 36 of one of the transposed bases 34 is compared with transposed elevation ELV_T of each of the corresponding transposed cells 36 for which transposed metadata MD_T is indicative of a measured elevation. The smallest elevation difference resulting from such comparisons is then used as a basis for assessing local coherence level NCL of the transposed cell 36.

In one particular example, local consistency level NCL is chosen from a high consistency level, a medium consistency level and a low consistency level.

The assessed local coherence level of a transposed cell 36 is, for example, a high coherence level if the smallest elevation difference between transposed elevation ELV_T of the transposed cell 36 and transposed elevation ELV_T of each of the corresponding transposed cells of the other transposed bases 34 is less than or equal to 15 m.

The assessed local coherence level of a transposed cell 36 is, for example, a medium coherence level if the smallest elevation difference between the transposed elevation ELV_T of the transposed cell 36 and transposed elevation ELV_T of each of the corresponding transposed cells of the other transposed bases 34 is greater than 15 m and less than or equal to 30 m.

The assessed local coherence level of a transposed cell 36 is, for example, a low coherence level if the smallest elevation difference between transposed elevation ELV_T of the transposed cell 36 and the transposed elevation ELV_T of each of the corresponding transposed cells of the other transposed bases 34 is greater than 30 m and less than or equal to 100 m.

As an example, if the smallest elevation difference between transposed ELV_T elevations of a transposed cell 36 is the elevation difference between a transposed ELV_T elevation with a value of 126 m (e.g., resulting from transposing ELV elevation of a NASADEM type source base) and a transposed ELV_T elevation with a value of 101 m (e.g., resulting from transposing ELV elevation of an ALOS type source base), the difference between these transposed ELV_T elevations is equal to 25 m and local coherence level NCL of the transposed cell 36 is evaluated as average.

In other examples, local coherence level NCL is expressed directly as the value of the smallest elevation difference between transposed elevation ELV_T of the transposed cell 36 and transposed elevation ELV_T of each of the corresponding transposed cells of the other transposed bases 34. Local coherence level NCL is then expressed, for example, in meters. A high NCL then corresponds to a low elevation difference, expressed in meters, e.g., an elevation difference of 50 m, 30 m, 15 m or 10 m or less. Conversely, a low NCL corresponds to a large difference in elevation expressed in meters, for example, a difference in elevation of more than 50 m, 80 m or 100 m.

Assistance module 18 is configured to determine an aircraft navigation assistance datum D, based on local coherence level NCL evaluated for at least one of the transposed cells 36.

The first embodiment illustrated in FIG. 1, for which a confidence index IC in a given consistency level NC forms assistance data D generated by assistance module 18, is now presented.

Segmentation module 20 is configured to segment area 30 of terrain corresponding to at least one of transposed bases 34 into a plurality of areas of interest 38.

In particular, segmentation module 20 is configured to segment area 30 of the terrain so that each area of interest 38 includes a plurality of adjacent transposed cells 36. As illustrated schematically in FIG. 5, each area of interest 38 of the same transposed base 34 includes, for example, the same number of transposed cells 36.

In one particular example, each area of interest 38 includes a set of 120 transposed cells per 120 transposed cells.

In such an example, and in the case where the reference mesh is such that a region of 1° longitude by 1° latitude is partitioned into 1,200 transposed cells by 1,200 transposed cells 36, such a region of 1° longitude by 1° latitude includes one hundred areas of interest 38.

Each area of interest is then, for example, substantially in the shape of a square with a side length corresponding to an angle equal to 6 arc minutes, or in other words a length of about 6 nautical miles, noted Nm.

Assistance module 18 is configured to determine, for area of interest 38, a confidence index IC at a given consistency level NC.

Confidence index IC then forms the support data and is determined according to local coherence level NCL of each transposed cell 36 of area of interest 38.

Confidence index IC in a given NC coherence level is determined, for example, according to the proportion, over area of interest 38, of transposed cells 36 whose local coherence level NCL is greater than or equal to the given NC coherence level.

For example, for a given NC level of coherence equal to an average level of coherence, the confidence index IC in the average level of coherence corresponds to the proportion of cells, in area of interest 38, whose local coherence level NCL is average or high.

It will be understood that, alternatively, assistance module 18 is configured to determine, for area of interest 38, a consistency level for a given confidence index.

With reference to FIG. 4, user interface 26 is configured to receive, from a user, a target consistency level NCC and a confidence limit index ICL in the target consistency level NCC.

In the embodiment shown, user interface 26 has a keyboard and a display. Alternatively, user interface 26 is, for example, provided with a touch screen.

Target coherence level NCC corresponds to a coherence level, as defined above for local coherence levels NCL, that the user of system 10 wishes to evaluate on area of interest 38.

The limiting confidence index ICL in the target consistency level NCC corresponds, for example, to a minimum confidence index that the user wishes to obtain in target consistency level NCC over area of interest 38.

Pairs of limit confidence index ICL and target consistency level NCC are derived, for example, from regulations or user requirements.

For example, an ICL of 95% at a coherence level of 30 m is required for the use of a transposed base 34, or a corresponding source base 28, for aircraft navigation in an airport area.

Again, for example, a limiting confidence index ICL of 80% at a coherence level of 80 m is required for use of a transposed base, or a corresponding source base 28, for navigation of an aircraft outside an airport area.

Validation module 22 is configured to validate an area of interest 38 if the determined confidence index IC in the target consistency level NCC is greater than or equal to the limit confidence index ICL, and to reject an area of interest 38 if the determined confidence index IC is less than the limit confidence index ICL.

Figure 5:
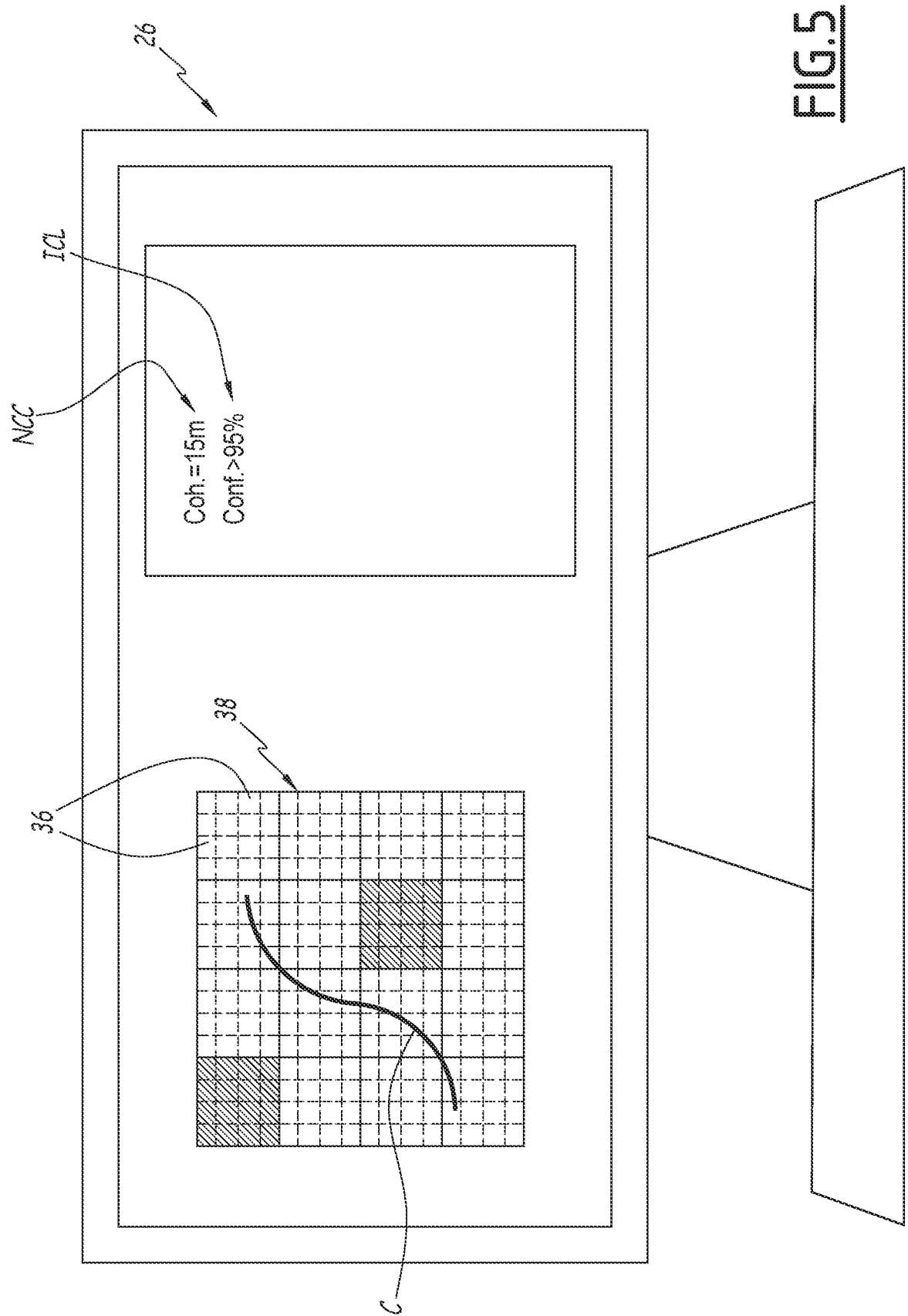
FIG. 5 is a representation of a display controlled by FIG. 1.

As illustrated in FIG. 5, command module 24 is, for example, configured to command display of an enabled state if area of interest 38 is enabled by enabling module 22, or a rejected state if area of interest 38 is rejected by enabling module 22. In particular, command module 24 is connected to user interface 26 to command display of the enabled or rejected status on user interface 26. In the example shown in FIG. 5, rejected areas of interest 38 are hatched on user interface 26, while validated areas of interest 38 are not hatched on user interface 26.

In an embodiment that is not illustrated, command module 24 is configured to generate an alert when an aircraft overflies a rejected area of interest 38.

Alternatively or additionally, command module 24 is configured to command generation of an aircraft trajectory outside rejected area(s) of interest 38. Such a trajectory is, for example, further displayed on user interface 26, as represented by a curve C in FIG. 5.

Command module 24 is, for example, configured to obtain an initial trajectory of the aircraft, and to generate the trajectory of the aircraft from the initial trajectory, so that the trajectory of the aircraft extends entirely outside rejected area(s) of interest 38.

The second embodiment, shown in FIG. 2, for which a target elevation ELV_C forms the data generated by assistance module 18, is now presented.

In this embodiment, and as illustrated in FIG. 6, assistance module 18 is configured to determine a target base 40 of terrain data, corresponding to area 30 of the terrain, cut according to the reference mesh into a plurality of target cells 42.

As illustrated in FIG. 6, each target cell 42 corresponds to a transposed cell 36 of each transposed base 34, the reference mesh being common to target base 40 and transposed bases 34.

Target base 40 includes, for each target cell 42, a target elevation ELV_C forming assistance data D.

In particular, assistance module 18 is configured, according to this embodiment, to determine target elevation ELV_C of target cell 42 as a function of transposed elevations ELV_T of at least two corresponding transposed cells 36, whose local coherence level NCL is higher than the local coherence level NCL of the other corresponding transposed cells 36.

For example, assistance module 18 is configured to determine target elevation ELV_C of target cell 42 based on transposed elevations ELV_T of at least two corresponding transposed cells 36 by implementing a Kalman filter for merging transposed elevations ELV_T of at least two transposed cells 36.

In a particular example, assistance module 18 is configured to determine target elevation ELV_C of target cell 42 based on transposed elevations ELV_T of the two corresponding transposed cells 36, whose local coherence level NCL is greater than the local coherence level NCL of the other corresponding transposed cells 36. Thus, in this example, target elevation ELV_C of a target cell 42 is determined based only on the two transposed elevations ELV_T of transposed cells 36 with the highest local coherence level.

In the examples of FIGS. 1 and 2 illustrating the first and second embodiments previously described, assistance system 10 includes an information processing unit 50 formed, for example, by a memory 52 and a processor 54 associated with memory 52.

In the examples of FIGS. 1 and 2, acquisition module 12, transposition module 14, evaluation module 16, assistance module 18, and, in the example of FIG. 1, segmentation module 20, validation module 22 and control module 24, are each realized in the form of software, or a software brick, executable by processor 54.

Memory 52 of assistance system 10 is then adapted to store software for acquiring a plurality of source bases 28, software for transposing each source base 28 into a respective transposed base 34, software for evaluating a local coherence level NCL for at least one transposed cell 36 of a respective transposed base 34, and software for assisting navigation of the aircraft. In the example of FIG. 1, the memory is further adapted to store software for segmentation of the terrain area corresponding to at least one of the bases transposed into a plurality of areas of interest, software for validation of an area of interest 38, and software for display command and/or trajectory generation.

Processor 54 is then able to execute each of acquisition software, transposition software, evaluation software, support software, and, in the example of FIG. 1, segmentation software, validation software and command software.

In a non-illustrated embodiment, the system includes two separate information processing units, each unit including, for example, a memory and a processor associated with the memory, one of the units being carried on board an aircraft while the other of the units is installed outside the aircraft. Acquisition module 12, transposition module 14, evaluation module 16, assistance module 18 and segmentation module 20 are each, for example, implemented as software or a software brick that may be run by the processor of the unit installed outside the aircraft. The validation software and the command software are, for example, each realized as a software package, or a software brick, executable by the processor of the unit on board the aircraft.

In a variant not shown, reception module 12, speech recognition module 14, evaluation module 16, acquisition module 18, and, for example, segmentation module 20, validation module 22 and control module 24, are each produced in the form of a programmable logic component, such as a FPGA (Field-Programmable Gate Array), or as a dedicated integrated circuit, such as an ASIC (Application-Specific Integrated Circuit).

When assistance system 10 is in the form of one or more software, that is to say in the form of a computer program, it is also capable of being stored on a computer-readable medium, not shown. The computer-readable medium is, for example, a medium that stores electronic instructions and is coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program including software instructions.

Figure 3:
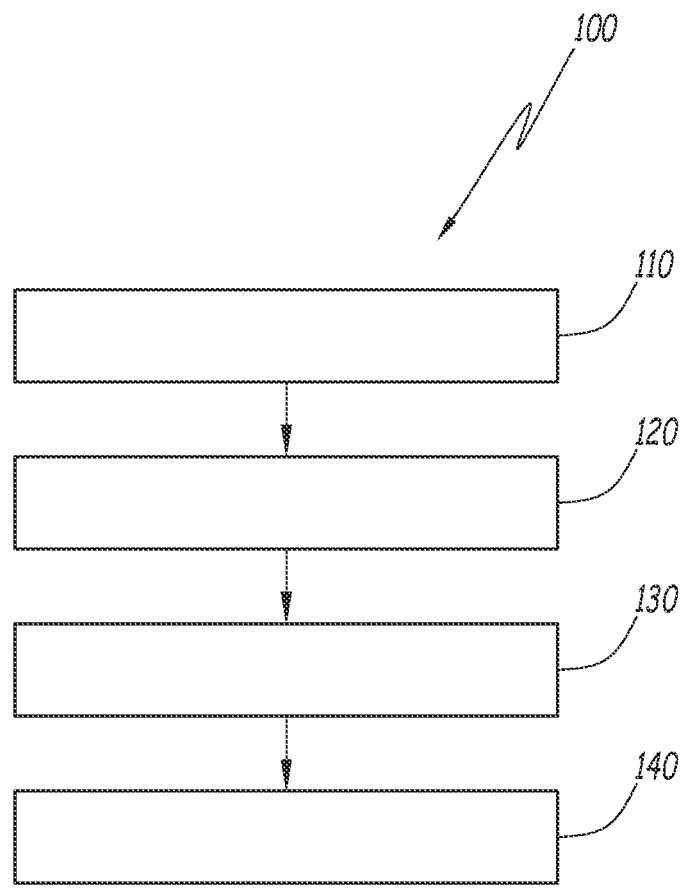
FIG. 3 is a flowchart of a method for assisting the navigation of an aircraft implemented by the electronic system of FIG. 1 or that of FIG. 2.

With reference to FIG. 3, a method for assisting navigation of an aircraft 100, implemented by electronic assistance system 10, is now presented.

In an initial acquisition operation 110, acquisition module 12 acquires a plurality of source bases 28, as described above. As seen above, each source database contains, for each of its cells 32, an ELV elevation, and contains, for example, an MD metadata. Acquisition module 12 then communicates the plurality of acquired source bases 28 to transposition module 14.

Transposition module 14 then transposes each source base 28 into a transposed base 34 in a transposition operation 120. As illustrated in FIG. 4 and described above, the reference mesh according to which each transposed base 34 in area 30 of the terrain is cut, is common to all transposed bases 34.

Each transposed base in transposition operation 120 then includes, for each transposed cell 36, a transposed elevation ELV_T, or even further a transposed metadata MD_T. Transposition module 14 then communicates the plurality of transposed bases 34, resulting from transposition of the plurality of source bases 28, to evaluation module 16.

Evaluation module 16 then evaluates, in a subsequent evaluation operation 130, a local consistency level NCL for at least one transposed cell 36 of a respective transposed base 34. In particular, local coherence level NCL for transposed cell 36 of a respective transposed base 34 is determined based on comparison of transposed elevation ELV_T of the transposed cell 36 with transposed elevation ELV_T of the corresponding transposed cell 36 of at least one other transposed base 34. Evaluation module 16 then communicates to support module 18 the local consistency level NCL for at least one transposed cell 36 of a transposed base 34.

In a subsequent operation 140 of determining an aircraft navigation assistance datum, assistance module 18 determines an aircraft navigation assistance datum D as a function of evaluated local consistency level NCL of at least one transposed cell 36 of one of transposed bases 34.

As seen above, in a first embodiment, assistance data D is formed by a confidence index IC in a given consistency level NC. In operation 140 of determining an aircraft navigation assistance datum, segmentation module 20 segments terrain area 30 into a plurality of areas of interest 38. Support module 18 then determines, for area of interest 38, confidence index IC in a coherence level NC based on local coherence level NCL of each transposed cell 36 of the area of interest 38.

As seen above, in a second embodiment, assistance data D is, for example, formed by a target elevation ELV_C of a target cell 42 of a target base 40. During operation 140 of determining aircraft navigation assistance data, assistance module 18 then determines target elevation ELV_C of target cell 42 as a function of transposed elevations ELV_T of at least two corresponding transposed cells 36, whose local coherence level NCL is higher than the local coherence level NCL of the other corresponding transposed cells 36.

The use of an evaluation module 16 configured to evaluate local coherence level NCL of a transposed cell 36 as a function of the smallest elevation difference between the transposed elevation of the cell 36 and the transposed elevation of the corresponding transposed cell 36 of each other transposed base 34 is particularly advantageous since it makes it possible to exclude from the evaluation of local coherence level NCL the transposed bases 34 whose transposed elevations ELV_T of the corresponding cells 36 are remote from the transposed elevation ELV_T of the cell, the probability that the transposed elevations ELV_T of corresponding cells of such transposed bases are erroneous being high.

The chosen levels of consistency are particularly relevant in the field of aircraft navigation assistance.

The use of the metadata for the evaluation of the local consistency level NCL of each transposed cell 36, and in particular the evaluation of the local consistency level NCL as a function of the smallest elevation difference between the transposed elevation ELV_T of the cell 32 and transposed elevation ELV_T of corresponding transposed cell 36 of each other transposed base 34, is particularly advantageous as it allows only ELV_T elevation data having been measured during elaboration of source base 28 resulting in transposed base 34 to be considered. Thus, the use of metadata avoids, for example, evaluation of local consistency level NCL based on comparison of data from the same measurements, or in other words, avoids comparison of mutually dependent data for the calculation of local consistency level NCL, thus improving quality of the evaluation of local confidence level NCL and thus of navigation assistance.

Determining a confidence index IC in a consistency level NC over an area of interest 38 and, where appropriate, validating and commanding a display or the generation of a trajectory as a function of such a confidence index IC in a consistency level NC over an area of interest 38, makes it possible to take into account possible local errors in source bases 28 in the navigation assistance, and where appropriate, to display validation information or to generate a trajectory in a more reliable manner.

Determining target elevation of target cell 42 as a function of transposed elevations ELV_T of at least two corresponding transposed cells 36 further enables a target base 40 to be formed whose ELV_C elevation values are more accurate than the ELV elevation values of source bases 28.

The invention claimed is:

1. An electronic system for assisting the navigation of an aircraft, comprising:
   an acquisition module acquiring a plurality of source bases of terrain data, each source base corresponding to a zone of a terrain likely to be overflown by the aircraft, divided according to a mesh into a plurality of cells, each corresponding to a sector of the zone of the terrain, each source base containing, for each cell, an elevation;
   a transposition module transposing each source base into a respective transposed base of terrain data, each transposed base corresponding to the zone of the terrain, divided according to a reference mesh into a plurality of transposed cells, the reference mesh being common to all transposed bases, each transposed base including, for each transposed cell, a transposed elevation;
   an evaluation module evaluating a local coherence level for at least one transposed cell of a respective transposed base, based on comparison of the transposed elevation of the cell with the transposed elevation of the corresponding transposed cell of at least one other transposed base; and
   an assistance module determining an aircraft navigation assistance datum, as a function of the local coherence level evaluated for the at least one transposed cell.

2. The electronic system according to claim 1, in which said evaluation module evaluates the local coherence level according to the smallest elevation difference between the transposed elevation of the cell and the transposed elevation of the corresponding transposed cell of each other transposed base.

3. The electronic system according to claim 2, in which the local coherence level is selected from a high coherence level, a medium coherence level and a low coherence level, the local coherence level evaluated being a high level of consistency if the smallest elevation difference is less than or equal to 15 m, a medium level of consistency if the smallest elevation difference is greater than 15 m and less than or equal to 30 m, and a low level of consistency if the smallest elevation difference is greater than 30 m and less than or equal to 100 m.

4. The electronic system according to claim 1, in which each source base further contains, for each cell, a metadata associated with the elevation, each transposed base including, for each transposed cell, a transposed metadata, said evaluation module then evaluating the local consistency level for each transposed cell of a respective transposed base, as a function of the transposed metadata of the cell and the transposed metadata of the corresponding cell of each other transposed base.

5. The electronic system according to claim 4, in which the metadata is indicative of a measured elevation or a predefined elevation, said evaluation module then evaluating local consistency level based solely on comparison of elevations of transposed cells whose metadata is indicative of a measured elevation.

6. The electronic system according to claim 1, further comprising a segmentation module segmenting the area of terrain corresponding to at least one of the transposed bases into a plurality of areas of interest, each area of interest comprising a plurality of adjacent transposed cells, wherein said assistance module determines, for the area of interest, a confidence index at a given coherence level, the confidence index forming the assistance data and being determined as a function of local coherence level of each transposed cell of the area of interest.

7. The electronic system according to claim 6, in which the confidence index in a given coherence level is determined as a function of the proportion, over the area of interest, of transposed cells whose local coherence level is greater than or equal to the given coherence level.

8. The electronic system according to claim 6, further comprising:
   a user interface receiving, from a user, a target consistency level and a confidence limit index in the target consistency level; and
   a validation module validating an area of interest if the confidence index determined at the target consistency level is greater than or equal to the confidence index limit, and rejecting an area of interest if the confidence index determined in the target consistency level is less than the confidence index limit; and
   a command module commanding a display of an enabled state if the area of interest is enabled by said enabling module, or a rejected state if the area of interest is rejected by said enabling module, and/or commanding generation of an aircraft trajectory outside the rejected area(s) of interest.

9. The electronic system according to claim 1, in which said assistance module is configured to determine a target base of terrain data, corresponding to the zone of the terrain, divided according to the reference mesh into a plurality of target cells; the target base including, for each target cell, a target elevation forming the assistance data, said assistance module then being configured to determine the target elevation of the target cell as a function of the transposed elevation of at least two corresponding transposed cells, whose local coherence level is greater than the local coherence level of the other corresponding transposed cells.

10. A method of assisting the navigation of an aircraft, implemented by an electronic system for assisting the navigation of an aircraft, the method comprising:
    acquiring a plurality of source bases of terrain data, each source base corresponding to an area of terrain likely to be overflown by the aircraft, divided into a mesh of a plurality of cells, each corresponding to a sector of the area of terrain, each source base containing, for each cell, an elevation;
    transposing each source base into a respective transposed base of terrain data, each transposed base corresponding to the zone of the terrain, divided according to a reference grid into a plurality of transposed cells, the reference grid being common to all the transposed bases, each transposed base including, for each transposed cell, a transposed elevation;
    evaluating a local coherence level for at least one transposed cell of a respective transposed base, based on comparison of the transposed elevation of the cell with the transposed elevation of the corresponding transposed cell of at least one other transposed base; and
    determining navigation assistance data for the aircraft, according to the evaluated local coherence level of at least one transposed cell of one of the transposed bases.

11. A non-transitory computer-readable medium including a computer program comprising software instructions which, when executed by a computer, implement a method according to claim 10.

* * * * *